3,265,622
LUBRICANTS CONTAINING COPOLYMERS OF 4-METHYL-1-PENTENE

William S. Anderson, Oakland, Calif., assignor to Shell Oil Company, New York, N.Y., a corporation of Delaware
No Drawing. Filed Oct. 31, 1961, Ser. No. 148,814
3 Claims. (Cl. 252—59)

This invention relates to improved mineral oil and fuel compositions, etc. containing a new and novel non-ash forming hydrocarbon polymer additive, and a process of preparing such polymers.

It is well known, too, in the art that certain olefinic polymers such as polyisobutylenes, polystyrenes, copolymers of isobutylene and naphthalene, copolymers of butenes and long chain alpha-olefins such as octene-1 or octadecene-1, are useful as pour point depressants and viscosity index improvers for mineral oils as well as many other uses. However, polymers of this type are readily attacked by atmospheric oxygen thus rendering them brittle, thermally and mechanically unstable particularly when used in lubricants subject to high shear rates or as thermoplastics. This apparent inherent instability of this class of polymers is the cause, when present in lubricants, of viscosity loss and other undesirable side reactions which occur in oils containing such additives. This is particularly aggravating when the base oil contains other additives such as detergents, extreme pressure additives such as organic metal salts, nitrogen-containing detergent polymers, organic phosphorus-containing compounds and the like, which tend to interact with the unstable components of the olefinic polymers mentioned above and thus cause sludging, wear and corrosion.

An object of the present invention is to provide an oil-soluble hydrocarbon copolymer which is mechanically stable under extreme shear rate conditions. A particular object of the present invention is to provide an oil-soluble hydrocarbon copolymer which is resistant to oxidation and is mechanically stable and which reduces the slope of the oil viscosity vs. temperature curve. Another object of the present invention is to provide a process for forming a novel oxidatively, mechanically and thermally stable oil-soluble hydrocarbon copolymer oil additive. Other objects in accordance with the invention will be apparent hereinafter.

It has now been discovered that an excellent oxidatively, mechanically and thermally stable oil additive capable of improving the lubricating properties, e.g., viscosity index of mineral oils can be provided by a particular non-crystalline copolymer of ethylene and 4-alkyl-1-pentene, wherein the alkyl radical is from 1 to 4 carbon atoms, e.g., methyl or ethyl radical, of high molecular weight, namely in the range of 10,000 to 800,000, preferably between 25,000 and 500,000 prepared in the presence of a particular polymerization catalyst and solvent.

By a particular non-crystalline copolymer of ethylene and 4-$C_{1-4}$ alkyl-1-pentene, e.g., 4-methyl-1-pentene is meant one prepared under restricted conditions of monomer ratio, solvent, catalyst and reaction temperature as will be hereinbelow described. It is essential that this be clearly understood since the prior art, such as U.S. Patent 2,842,532 or Campbell's paper on "Poly(4-Methyl-1-Pentene) and Some Soluble Crystalline Copolymers," Journal of Applied Polymer Science, vol. V, issue No. 14 (1961), relate to polymerization of 4-methyl-1-pentene in order to make crystalline or fibrous polymers from which various articles of manufacture can be made. However such polymers lack desired oil solubility. Ethylene/4-$C_{1-4}$ alkyl-1-pentene, e.g., ethylene/4-methyl-1-pentene copolymers of the present invention are entirely different in properties from these materials, being non-crystalline and thermally, mechanically and oxidatively stable, and at appropriate monomer ratios are capable of imparting a number of desired properties such as improved viscosity index to mineral oils.

In essence the copolymer of ethylene and 4-$C_{1-4}$ alkyl-1-pentene, e.g., 4-methyl-1-pentene or 4-ethyl-1-pentene of the present invention is produced by polymerizing a mixture of from 10% to 90% of ethylene with 10% to 90% (mol) of dimers of 1-olefin as defined such as 4-$C_{1-4}$ alkyl-1-pentene in the presence of an inert hydrocarbon solvent and a catalyst of the Ziegler type which essentially is a reaction product of a metallo-alkyl compound of Groups I, II or III and a metal halide such vanadium halide, e.g., vanadium chloride or vanadium oxyhalide, e.g., vanadium oxychloride or vanadium esters. The ratio of ethylene to 4-$C_{1-4}$ alkyl-1-pentene monomers that is maintained during the polymerization will vary depending on the proportion of the respective monomers desired in the final elastomer. In the preferred embodiments the copolymer may contain from about 10 mole percent to about 90 mole percent, preferably 30–80 mole percent of ethylene units in the copolymer. Because the monomers do not polymerize at the same rate, i.e., ethylene polymerizes faster than the other monomer, the ratio of the starting mixture of monomers is not the same as that desired in the final product and this is one of the major considerations in selecting the starting monomer ratios to give a particular final product. Other considerations are the choice of catalyst components and their respective proportions and the polymerization conditions.

Suitable liquid solvents may be hydrocarbon compounds such as aromatics, alkanes, cycloalkanes or commercially available mixtures such as butane, isobutane, n-pentane, n-hexane, n-heptane, n-octane, isooctane, n-decane, dodecane, cyclo-hexane, dimethylcyclohexane, decalin, benzene, etc. Preferred are the inert hydrocarbon solvents such as n-heptane, n-decane, etc. The metallo-alkyl compounds used as one of the catalyst components are alkyl aluminum compounds and aluminum haloalkyls and include triisobutyl aluminum, trioctyl aluminum, trinonyl aluminum, tridecyl aluminum, aluminum diethyl chloride, and others. Preferably the alkyl radicals of the trialkyl aluminum should have from 4 to 10 carbon atoms, but not more than 16 carbon atoms. For economic reasons, the number of carbon atoms in the alkyl radicals preferably range from 4 to 8. The ratio of the aluminum compounds to the vanadium oxychloride or vanadium tri- or tetrachloride may vary widely but preferably the aluminum to vanadium mole ratio is greater than 2. The catalyst is simply prepared by mixing and reacting the catalyst components in a hydrocarbon solvent whereupon there is formed a reaction product which is the catalyst.

The reaction temperature can vary from −20° C. to 60° C., preferably between 20° C. and 40° C.

The following examples are illustrative of the present invention:

EXAMPLE A

To a mixture of 0.10 ml. of vanadium oxychloride and 0.50 ml. of triisobutyl aluminum was added 30 ml. of 4-methyl-1-pentene, followed by ethylene at one atmosphere to saturate. The reaction polymerization temperature was maintained at 33–39° C. for about 3 hours. The copolymer formed was soluble in hot xylene. A hot chlorofrom soluble portion was extracted from the xylene soluble portion and this fraction was oil-soluble and after removal of the chloroform by distillation had an intrinsic viscosity in a 100 SUS at 100° F. mineral lubricating oil of 0.80 dl./g. at 100° F. and 0.68 dl./g. at 210° F.

Following the above procedure other copolymers of the present invention were prepared as shown in Table I.

Table I

| Example [1] | Reaction Temp., °F. | Pressure, atmosphere | Polymeric Components, mol percent | Intrinsic viscosity in mineral oil at 100° F. |
|---|---|---|---|---|
| B | 35 | 1 | 4-methyl-1-pentene (40), ethylene (60). | 0.85 |
| C | 50 | 1 | 4-ethyl-1-pentene (20), ethylene (80). | 0.70 |
| D | 30 | 1 | 4-methyl-1-pentene (30), ethylene (70). | 0.75 |
| E | 38 | 1 | 4-methyl-1-pentene (10), ethylene (90). | 0.82 |

[1] B and C solvents=n-heptane, catalyst=vanadium trichloride/trioctyl aluminum; D solvent=n-decane, catalyst=vanadium tetrachloride/tributyl aluminum; E solvent=n-hexane, catalyst=vanadium oxychloride/tributyl aluminum.

When desired, additional improvements with respect to oxidation stability and scuffing inhibition can be imparted to the oil compositions containing the copolymers of this invention by incorporating small amounts (0.01%–2%, preferably 0.1%–1%) of phenolic antioxidants such as alkylphenols, e.g., 2,6-ditertbutyl-4-methylphenol or p,p'-methylene bisphenols such as 4,4'-methylene bis(2,6-ditertbutyl phenol) or arylamines such as phenyl-alpha-naphthylamine, dialkyl sulfides and mixtures thereof, e.g., dibenzyl disulfide, didodecyl sulfide. Anti-scuffing agents include organic phosphites, phosphates, phosphonates and their thio-derivatives, such as $C_{3-18}$ alkyl phosphites, or phosphonates, e.g., di- and tributyl, octyl, lauryl, stearyl, cyclohexyl, benzyl, cresyl, phenyl, phosphites or phosphates, as well as their thio-derivatives, $P_2S_5$-terpene reaction products, e.g., $P_2S_5$-pine oil reaction product and alkali metal salts thereof such as a potassium salt of a $P_2S_5$-terpene reaction product, phosphonates such as dibutyl methanephosphonate, dibutyl trichloromethanephosphonate, dibutyl monochloromethanephosphonate, dibutyl monochloromethanephosphonate, dibutyl chlorobenzenephosphonate, and the like. The full esters of pentavalent phosphorus acids such as triphenyl, tricresyl, trilauryl and tristearyl ortho-phosphates or potassium salt of $P_2S_5$-terpene reaction product are preferred.

The polymeric additives of this invention improve various mineral oil products by the incorporation of a minor amount (0.01% to 5%, preferably 0.1% to 3% by weight) of the additive. Thus, they may be used to improve transformer oils, turbine oils, hydraulic fluids, mineral lubricating oils, industrial oils and the like. Suitably such lubricating oils range from SAE 5W viscosity grade to SAE 140 grade and are derived from paraffinic, naphthenic or asphaltic base crudes. Representative oils are refined high viscosity index mineral oils having a viscosity of 100° F. of 100 to 250 SUS. A typical mineral lubricating oil (X) of this type had the following properties:

| | |
|---|---|
| Gr., ° API, 60/60° F. | 32 |
| Flash, ° F. | 370 |
| Viscosity index (Dean and Davis) | 93 |
| Viscosity, SUS at 100° F. | 103 |

The following non-ash compositions are representative of this aspect of the invention.

| | Percent wt. |
|---|---|
| Composition A: | |
| Example A copolymer | 2 |
| Mineral lubricating oil (X) | Bal. |
| Composition B: | |
| Example B copolymer | 2 |
| Mineral lubricating oil (X) | Bal. |
| Composition C: | |
| Example C copolymer | 2 |
| Mineral lubricating oil (X) | Bal. |
| Composition D: | |
| Example D copolymer | 2 |
| Mineral lubricating oil (X) | Bal. |
| Composition E: | |
| Example E copolymer | 2 |
| Mineral lubricating oil (X) | Bal. |
| Composition F: | |
| Example A copolymer | 3 |
| 4,4'-methylene bis(2,6-ditertbutylphenol) | 1 |
| Mineral lubricating oil (aviation oil 1100 grade) | Bal. |
| Composition G: | |
| Example A copolymer | 5 |
| 4,4'-methylene bis(2,6-ditertbutylphenol) | 0.5 |
| Tricresyl phosphate | 0.8 |
| Mineral lubricating oil (X) | Bal. |
| Composition H: | |
| Example A copolymer | 3 |
| 4,4'-methylene bis(2,6-ditertbutylphenol) | 5 |
| Didodecyl sulfide | 2 |
| Mineral lubricating oil (SAE 30) | Bal. |

Lubricating oils containing copolymers of the present invention, such as copolymer of Example A, improve the viscosity index of oils. Thus, a mineral oil (X) containing copolymer of Example A in a concentration equivalent to give the composition an intrinsic viscosity at 100° F. of 0.80 dl./g. had a viscosity index value of 85, whereas the same base oil containing 3% of an oil-soluble ethylene/propylene copolymer had an intrinsic viscosity at 100° F. of 0.9 and a viscosity index of 69. Copolymers of this invention are also stable as evidenced when compositions A–H are tested in an ultrasonic degradator (400 watt Acoustica Associated DR–400A oscillator) at a peak power of 1600 watts and were found to be 5 to 10 times more resistant to degradation under similar test conditions than composition X [mineral oil (X)+2% copolymer of ethylene and octene-1 (50/50)]; Composition Y [mineral oil (X)+2% polyhexene-1]; Composition Z [mineral oil (X)+2% polylauryl methacrylate].

Lubricating compositions of this invention are particularly applicable for high speed use as in aviation engines, automotive engine, truck engines, industrial equipment as well as equipment such as hydraulic systems for brakes, elevators, and airplane control systems.

I claim as my invention:

1. A mineral lubricating oil composition comprising a major amount of mineral lubricating oil and from 0.01% to 5% of an oil-soluble copolymer of ethylene and 4-methyl-1-pentene obtained by reacting the monomers in the ratio of 10–90 mol percent ethylene and 90–10 mol percent 4-methyl-1-pentene in the presence of a liquid hydrocarbon soilvent, between —20° C. and 60° C., at atmospheric pressure, and a catalyst mixture selected from the group consisting of (1) a mixture of vanadium chloride and trialkyl aluminum and (2) a mixture of vanadium oxychloride and trialkyl aluminum, said copolymer having a molecular weight in the range of from 25,000 to 500,000.

2. A mineral lubricating oil composition comprising a major amount of mineral lubrictaing oil and from 0.01% to 5% of an oil-soluble copolymer of ethylene and 4-methyl-1-pentene obtained by reacting the monomers in the ratio of 90 mol percent etylene and 10 mol percent 4-methyl-1-pentene in the presence of n-heptane solvent, between 20° C. and 40° C., at atmospheric pressure, and vanadium oxychloride triisobutyl aluminum catalyst, said copolymer having a molecular weight in the range of from 25,000 to 500,000.

3. A mineral lubricating oil composition comprising a major amount of mineral lubricating oil and from 0.1% to 3% of an oil-soluble copolymer of ethylene and 4-methyl-1-pentene obtained by reacting the monomer in the ratio of 90 mol percent ethylene and 10 mol percent 4-methyl-1-pentene in the presence of n-heptane solvent, between 20° C. and 40° C., at atmospheric pressure, and vanadium chloride-triisobutyl aluminum catalyst, said copolymer having a molecular weight in the range of from 25,000 to 500,000.

References Cited by the Examiner

UNITED STATES PATENTS

| | | | |
|---|---|---|---|
| 2,327,705 | 8/1943 | Frolich et al. | 252—59 |
| 2,692,257 | 10/1954 | Zletz | 252—59 X |
| 2,746,925 | 5/1956 | Garber et al. | 252—59 |
| 2,901,432 | 8/1959 | Morway et al. | 252—59 |
| 3,010,949 | 11/1961 | Price | 260—88.2 |
| 3,037,008 | 5/1962 | Garetson et al. | 260—88.2 |

FOREIGN PATENTS

| | | |
|---|---|---|
| 553,655 | 6/1957 | Belgium. |
| 804,085 | 11/1958 | Great Britain. |

DANIEL E. WYMAN, *Primary Examiner.*

JULIUS GREENWALD, *Examiner.*

P. C. BAKER, P. P. GARVIN, *Assistant Examiners.*